US012596538B2

(12) United States Patent
Goloubew et al.

(10) Patent No.: US 12,596,538 B2
(45) Date of Patent: Apr. 7, 2026

(54) TRUST-BASED MODEL FOR DEPLOYING ISSUE IDENTIFICATION AND REMEDIATION CODE

(71) Applicant: Cisco Technology, Inc., San Jose, CA (US)

(72) Inventors: Dmitry Goloubew, Waterloo (BE); Donald M. Allen, Colorado Springs, CO (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 224 days.

(21) Appl. No.: 18/482,138

(22) Filed: Oct. 6, 2023

(65) Prior Publication Data

US 2025/0117201 A1     Apr. 10, 2025

(51) Int. Cl.
*G06F 8/60*          (2018.01)
*G06F 11/3698*       (2025.01)

(52) U.S. Cl.
CPC ............ *G06F 8/60* (2013.01); *G06F 11/3698* (2025.01)

(58) Field of Classification Search
CPC ............................... G06F 8/60; G06F 11/3698
USPC ............................... 717/168–174; 706/25–45
See application file for complete search history.

(56) References Cited

U.S. PATENT DOCUMENTS

| | | | | |
|---|---|---|---|---|
| 7,945,958 B2 * | 5/2011 | Amarasinghe | .......... | G06F 21/54 726/25 |
| 8,239,915 B1 * | 8/2012 | Satish | ...................... | G06F 21/00 726/4 |
| 9,547,579 B1 * | 1/2017 | Shen | ................... | G06F 11/3624 |
| 9,692,632 B2 * | 6/2017 | Bhattacharya | ........ | G06F 9/5072 |
| 10,282,550 B1 * | 5/2019 | Sheridan | ................... | G06F 8/65 |
| 11,487,534 B2 * | 11/2022 | Joyce | ................... | G06F 11/3476 |
| 11,550,903 B1 | 1/2023 | Epstein | | |
| 11,728,033 B2 * | 8/2023 | Spenciner | .............. | G16H 40/20 705/2 |
| 12,001,529 B1 * | 6/2024 | Anderson | ............... | G06F 21/31 |
| 12,035,136 B1 * | 7/2024 | Shahidzadeh | ....... | H04L 63/1425 |

(Continued)

OTHER PUBLICATIONS

Zhang et al, "Leveraging Artificial Intelligence on Binary Code Comprehension", ACM, pp. 1-3 (Year: 2022).*

(Continued)

*Primary Examiner* — Anil Khatri
(74) *Attorney, Agent, or Firm* — Edell, Shapiro & Finnan, LLC

(57)          ABSTRACT

A method, computer system, and computer program product are provided for selectively deploying code modules for issue identification and remediation tasks. A plurality of code modules is obtained, wherein each code module includes instructions for issue identification and remediation. A trust score for each code module of the plurality of code modules is determined, wherein the trust score includes a first trust score component for issue identification and a second trust score component for issue remediation, and wherein the trust score is based on a source of each code module selected from a group of a human-generated source and an artificial intelligence model-generated source. A particular code module of the plurality of code modules is deployed based on the trust score of the particular code module satisfying a threshold value. The trust score for the particular code module is updated based on results of deploying the particular code module.

20 Claims, 6 Drawing Sheets

(56) References Cited

U.S. PATENT DOCUMENTS

| | | | |
|---|---|---|---|
| 12,242,871 B2 * | 3/2025 | Jain | G06F 11/30 |
| 2021/0111970 A1 | 4/2021 | Nainar et al. | |
| 2022/0078072 A1 | 3/2022 | Rayes et al. | |
| 2022/0138333 A1 | 5/2022 | Espinosa et al. | |
| 2023/0070519 A1 | 3/2023 | Wright et al. | |

OTHER PUBLICATIONS

Toprani et al, "LLM Agentic Workflow for Automated Vulnerability Detection and Remediation in Infrastructure-as-Code", IEEE, pp. 1-7 (Year: 2025).*
Jouvray et al, "Enforcing Trust in Embedded Systems Using Models", ACM, pp. 1-8 (Year: 2010).*
Gobel et al, "Model-Based Trust Analysis of LLM Conversations", ACM, pp. 1-9 (Year: 2024).*
Cisco, "AI/ML—An overview of industry trends and Cisco CX use-cases," https://www.cisco.com/c/en/us/solutions/collateral/executive-perspectives/ai-ml-overview-of-industry-trends.html, Mar. 2021, 22 pages.
Cisco, "Cisco Business Process Automation Services," https://www.cisco.com/c/en/us/solutions/collateral/service-provider/at-a-glance-c45-742579.html, Jul. 2019, 3 pages.
Cisco, "Connected TAC: Customer Data Security," Cisco Public Information, retrieved from https://www.cisco.com/c/dam/en/us/support/docs/services/connected-tac/Connected_TAC_Security_Overview.pdf, Aug. 8, 2023, 8 pages.

* cited by examiner

400

START

410

OBTAIN PLURALITY OF CODE MODULES

420

DETERMINE TRUST SCORE FOR EACH CODE MODULE, WHEREIN TRUST SCORE INCLUDES COMPONENT FOR ISSUE IDENTIFICATION AND COMPONENT FOR ISSUE REMEDIATION

430

DEPLOY CODE MODULE BASED ON TRUST SCORE SATISFYING THRESHOLD VALUE

440

UPDATE TRUST SCORE BASED ON RESULTS OF DEPLOYING CODE MODULE

END

CONTROL LOGIC — 620

I/O — 614

I/O

NETWORK PROCESSOR UNIT(s) — 610

I/O — 612

STORAGE — 606

MEMORY ELEMENT(s) — 604

608

PROCESSOR(s) — 602

600

TRUST-BASED MODEL FOR DEPLOYING ISSUE IDENTIFICATION AND REMEDIATION CODE

TECHNICAL FIELD

The present disclosure relates generally to identifying and remediating issues in computing and/or telecommunication networks, and more specifically, to a trust-based model for deploying issue identification and remediation code.

BACKGROUND

Issue identification and remediation code refers to any code, logic, tools, or other solutions that can identify issues or anomalies in networking or computing environments and subsequently remediate those issues. Conventional digitized knowledge systems may employ humans or a combination of humans and machines to generate the issue detection (signature) and issue fix (remediation). The combination of the issue detection and issue fix may be referred to as a digitized intellection capital (IC). This process of qualifying this generated code incorporates testing and review stages, and relies on the trust relationship that a consumer of the code has developed with the creator. This trust is important, as a consumer may believe that a trusted manufacturer has performed the testing of both the detection and remediation to ensure that the code meets quality and reliability standards. Since network environments are different from one another, different consuming network environments may perform different levels of self-testing in order to further expand the trust that each network environment has in a particular set of code before deploying the code into their environment (e.g., through runbooks, automation, etc.).

DETAILED DESCRIPTION

Overview

Figure 1:
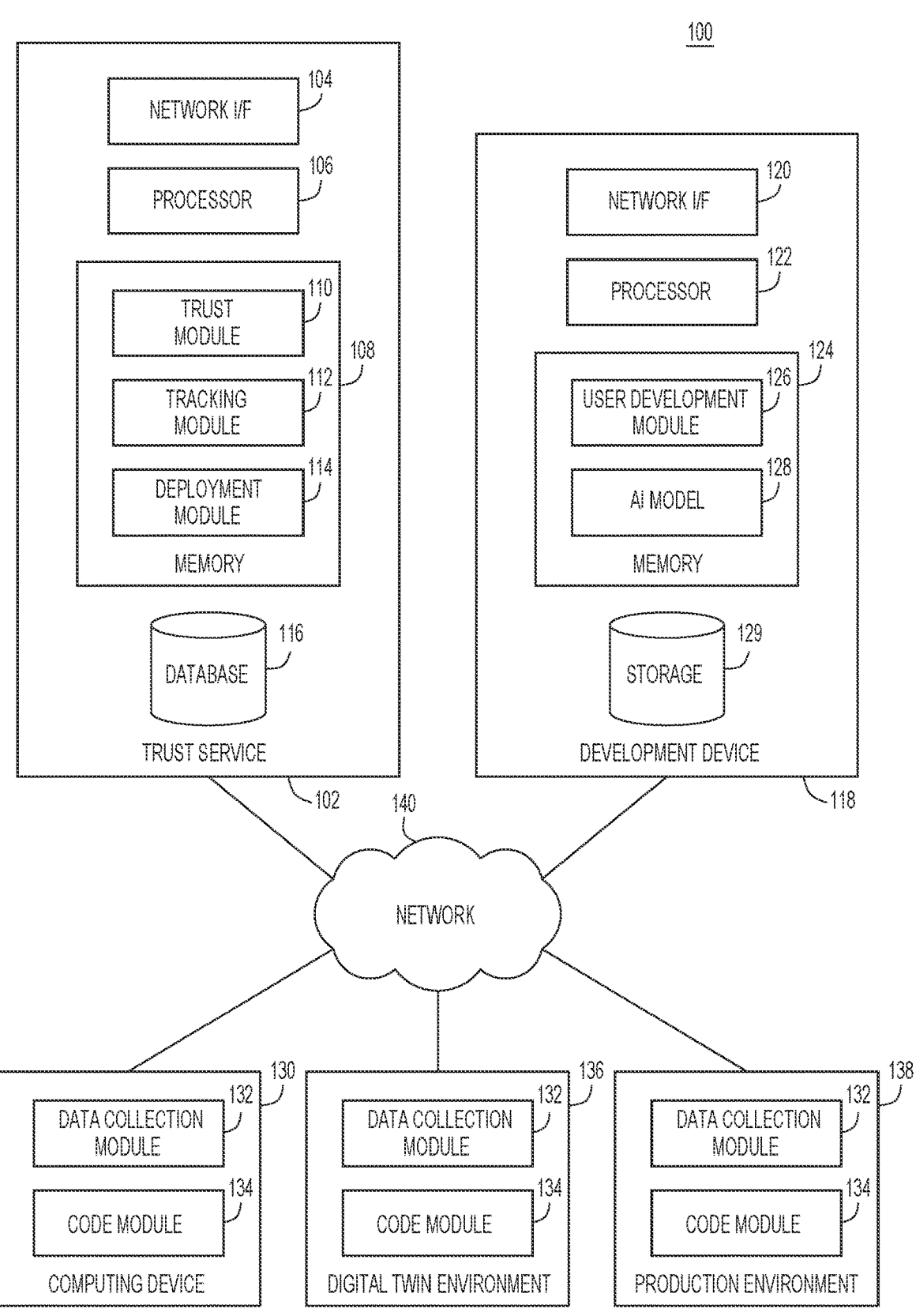
FIG. 1 is a block diagram of a network environment for selectively deploying code modules for issue identification and remediation tasks, according to an example embodiment.

According to one embodiment, techniques are provided for selectively deploying code modules for issue identification and remediation tasks. A plurality of code modules is obtained, wherein each code module includes instructions for issue identification and issue remediation in computer devices, networking devices or software running on the computer devices or networking devices. A trust score for each code module of the plurality of code modules is determined, wherein the trust score includes a first trust score component for issue identification and a second trust score component for issue remediation, and wherein the trust score is based on a source of each code module that is selected from a group of a human-generated source and an artificial intelligence model-generated source. A particular code module of the plurality of code modules is deployed based on the trust score of the particular code module satisfying a threshold value. The trust score for the particular code module is updated based on results of deploying the particular code module.

EXAMPLE EMBODIMENTS

Present embodiments relate to identifying and remediating issues in computing and/or telecommunication networks, and more specifically, to a trust-based model for deploying issue identification and remediation code. With the advent of generative machine learning (ML), such as large language models (LLMs), it is possible to produce code modules for issue identification and issue remediation very quickly and with minimum programming expertise-often in a manner of minutes. For example, a chat front-ended LLM can generate code in response to a user request for a script that will recognize a specified condition, such as "debug on" and provide code to apply remediation for a particular issue on a device in the network.

However, few consumers may be prepared to run machine-generated code modules directly on their production network. This is because the code modules potentially contain unknown risks, such as software bugs, and due to the possibility that running such code may cause unintended consequences on the consuming network. These concerns limit the adoption and impact of machine-generated code.

To address this problem, the embodiments presented herein provide a trust-based model for tracking issue identification and remediation code modules throughout the lifecycle of each module. The trust-based model accounts for the source of each code module (e.g., human-generated or machine-generated, created by a vendor, partner, consumer, or the general public, etc.), and enables code modules to be selectively deployed based on an assessed level of trust. In particular, a trust score for a code module may include multiple dimensions, such as a trust score component for issue identification and a trust score component for issue remediation. Thus, code modules can be separately tracked with regard to how trusted each module is for the module's ability to identify issues, and for the module's ability to remediate any identified issues. Moreover, trust scores can be continuously updated over the lifecycle of a code module, and trust scores can be adjusted to account for new data collected about a code module when the code module is tested and/or deployed to a production environment.

Thus, present embodiments improve the technical fields of issue identification and issue remediation in computing and/or communication networks. In particular, present embodiments automate the selective deployment of code modules based on a determined level of trust for each code module. By tracking the trust of code modules and selectively deploying code modules over their lifecycle, present embodiments can increase network uptime, decrease data loss, and more effectively improve the functionality of devices in an automated manner that is faster than conventional approaches. Thus, present embodiments provide the practical application of improving issue detection and remediation for computing or network devices in a fully-automated manner.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

FIG. 1 is a block diagram of a network environment 100 for selectively deploying code modules for issue identification and remediation tasks, according to an example embodiment. As depicted, network environment 100 includes a trust service 102, a development device 118, a computing device 130, a digital twin environment 136, and a production environment 138 that are in communication via a network 140. It is to be understood that the functional division among components have been chosen for purposes of explaining various embodiments and is not to be construed as a limiting example.

Trust service 102 includes a network interface (I/F) 104, at least one processor (computer processor) 106, memory 108 (which stores instructions for a trust module 110, a tracking module 112, and a deployment module 114), and a database 116. In various embodiments, trust service 102 may include a rack-mounted server, laptop, desktop, smartphone, tablet, or any other programmable electronic device capable of executing computer readable program instructions. Network interface 104 enables components of trust service 102 to send and receive data over a network, such as network 140. In general, trust service 102 and its modules enable the tracking, evaluation, and deployment of code modules for issue identification and remediation tasks.

Trust module 110, tracking module 112, and deployment module 114 may include one or more modules or units to perform various functions of the embodiments described below. Trust module 110, tracking module 112, and deployment module 114 may be implemented by any combination of any quantity of software and/or hardware modules or units, and may reside within memory 108 of trust service 102 for execution by a processor, such as processor 106.

Trust module 110 includes logic for tracking code modules over their lifecycle in order to assess each code module with regard to trust. In particular, trust module 110 may assess each code module by assigning or updating a trust score that can include multiple components, such as a component indicating a level of trust for a code module's ability to perform issue identification, and a component indicating a level of trust for a code module's ability to perform issue remediation. Each component of a trust score may be a numerical value that is determined by analyzing data that describes a code module, including a source of the code module, a demand (e.g., reason or justification) for using the code module, results of testing the code module via a variety of tests, and the like. Each datum that describes a code module can be assigned a particular numerical value, and these values can be used to determine an overall trust score or one or more of the components of a trust score (e.g., an issue identification component, an issue remediation component, etc.). For example, the numerical values for each datum describing a code module can be summed or otherwise combined (e.g., averaged, combined using a root mean square, etc.). Thus, any data describing a code module that indicates a higher level of trust may raise the trust score and/or one or more of its component values, and any data describing a code module that indicates a lower level of trust may lower the trust score and/or one or more of its component values. In this example it is assumed that a higher trust score indicates higher trust; however, in other embodiments a lower trust score can indicate higher trust.

In some embodiments, trust module 110 determines a trust score for a code module based on one or more factors including the source of the code module, the reason for using the code module, and/or the manner in which the code module has been tested (which may include results of each test). For example, trust module 110 may assign a higher trust score to a code module that is human-generated, whereas trust module 110 may assign a lower trust score to a code module that is generated using artificial intelligence (AI). Additionally, the source of the code module can influence a trust score depending on whether the code module is obtained from an in-house source (e.g., the code module is developed by an organization and the code module may be deployed in a network of the same organization), versus if the code module is developed by a partner of an organization or by a member of the public. The reason for using the code module may influence a trust score depending on whether the use for the code module is identified by an in-house party, identified by a partner organization or consumer organization, or identified by an end-user. The manner in which a code module is tested can influence a trust score depending on how closely the testing resembles an actual production environment, which can range from a developer device to an actual production environment test. Various embodiments for determining trust scores are described in further detail below with reference to FIG. 2.

Tracking module 112 tracks code modules over their lifecycle in order to gather any data or metadata describing each code module in order to assess code modules for trust. Tracking module 112 may gather data or metadata that describes the source of each code module, including how each code module is developed, as well as a reason for employing each code module. Additionally, tracking module 112 may obtain testing data indicating how each code module is tested. The testing data and results of testing (e.g., pass/fail data) can be obtained from data collection modules in the various testing environments (e.g., data collection module 132 of computing device 130, digital twin environment 136, and/or production environment 138). Tracking module 112 may track code modules over time so that trust module 110 can update trust scores as new data becomes available.

Deployment module 114 includes logic for deploying code modules to a production environment (e.g., production environment 138) when the trust score of a code module indicates that the code module is trustworthy. A code module's trust score can be compared to a threshold value, and if the trust score satisfies the threshold value, deployment module 114 may transmit instructions to cause the code module to be deployed to a production environment. Once deployed, the code module may perform issue identification and remediation in the production environment. Different threshold values may be used for different production environments. In some embodiments, each component of a trust score may be compared to a threshold value; either a same threshold value may be used to evaluate each component of a trust score, or separate threshold values can be defined for each component. Thus, a code module may not be deployed if the code module satisfies a threshold value for an issue identification component but fails to satisfy a threshold value for an issue remediation component. In some embodiments, there may be multiple code modules that are configured to identify and remediate a same issue, and deployment module 114 may deploy whichever code module has the best (e.g., highest) trust score. Deployment module 114 can evaluate the trust scores of code modules over time, so that if a code module is developed that targets a same issue as a previous code module and has a better trust score, that code module can be deployed to replace the previous code module.

Database 116 may include any non-volatile storage media known in the art. For example, database 116 can be implemented with a tape library, optical library, one or more independent hard disk drives, or multiple hard disk drives in a redundant array of independent disks (RAID). Similarly, data stored in database 116 may conform to any suitable storage architecture known in the art, such as a file, a relational database, an object-oriented database, and/or one or more tables. Database 116 may store data including code modules, data and/or metadata that describes code modules (e.g., data gathered by tracking module 112), and/or trust scores for code modules, include time-series trust scores indicating how particular code module's trust scores have changed over time.

Development device 118 includes a network interface (I/F) 120, at least one processor (computer processor) 122, memory 124 (which stores instructions for a user development module 126 and an artificial intelligence (AI) model 128), and storage 129. In various embodiments, development device 118 may include a rack-mounted server, laptop, desktop, smartphone, tablet, or any other programmable electronic device capable of executing computer readable program instructions. Network interface 120 enables components of development device 118 to send and receive data over a network, such as network 140. In general, development device 118 is used to generate code modules, which can be developed using human and/or AI-based techniques.

User development module 126 and AI model 128 may include one or more modules or units to perform various functions of the embodiments described below. User development module 126 and AI model 128 may be implemented by any combination of any quantity of software and/or hardware modules or units, and may reside within memory 124 of development device 118 for execution by a processor, such as processor 122.

User development module 126 may include software that is utilized by developers to facilitate the creation of code modules focused on issue identification and remediation. User development module 126 may receive input from a developer such as code, and can compile or otherwise generate a code module using the developer's input. In some embodiments, user development module 126 includes various tools such as automated bug or vulnerability identification, performance bottleneck identification, real-time feedback, version control mechanisms, and the like.

AI model 128 may include one or more artificial intelligence/machine learning (AI/ML)-based models that can automatically generate code modules for issue identification and remediation. AI model 128 may generate models based on a prompt that is entered by a user (e.g., natural language input). In various embodiments, AI model 128 can include a large-language model (LLM), a generative adversarial network, a sequence-to-sequence (Seq2Seq) model (including recurrent neural network (RNN) components and/or long short-term memory (LSTM) components), a transformer model, and the like. The model or models employed by AI model 128 can be trained using a corpus of training data that includes examples of user input (e.g., prompts) and corresponding output code for code modules. In some embodiments, the AI/ML model(s) of AI model 128 can be retrained using examples of the code for code modules that are deployed to production environments. Thus, as trust scores for code modules generally increase over time, the AI/ML model(s) of AI model 128 will improve in accuracy, thereby generating more trustworthy code modules.

Storage 129 may include any non-volatile storage media known in the art. For example, storage 129 can be implemented with a tape library, optical library, one or more independent hard disk drives, or multiple hard disk drives in a redundant array of independent disks (RAID). Similarly, data stored in storage 129 may conform to any suitable storage architecture known in the art, such as a file, a relational database, an object-oriented database, and/or one or more tables. Storage 129 may store code modules developed using development device 118, including the source code for code modules. Additionally or alternatively, storage 129 can store code corresponding to trained machine learning models and/or training data for machine learning models.

Computing device 130, digital twin environment 136, and production environment 138 may include various systems, simulated environments, and in-use production environments that can be used to test code modules in accordance with the embodiments presented herein. Each of computing device 130, digital twin environment 136, and production environment 138 may include a data collection module 132 and one or more code modules 134 that are provided for testing purposes. Data collection module 132 can collect any data regarding the execution of code modules 134 in order to identify and/or remediate issues. The data collected by data collection module 132 can include any error codes, statuses, logs, or other feedback obtained during execution of each code module 134. In particular, data collection module 132 may collect any data that is indicative of whether a code module 134 is successful in identifying issues, and any data that is indicative of whether a code module 134 is successful in remediating issues.

Computing device 130 may be a general-purpose computing device, such as a laptop, desktop, rack-mounted server, and the like, or computing device 130 may be configured to include particular features that are relevant for the issue that a code module is designed to identify and remediate. For example, computing device 130 may include specific hardware (e.g., a particular processor, hardware provided by a specific manufacturer, etc.) and/or specific software (e.g., a particular operating system, a particular version of a particular operating system, a particular driver, other software or firmware, etc.). In some embodiments, computing device 130 corresponds to a computing device of a developer (e.g., development device 118).

Digital twin environment 136 may include a virtual replica of a physical system, such as a production environment (e.g., production environment 138). Digital twin environment 136 may execute on one or more computing devices using any virtualization techniques. Using digital twin environment 136, the conditions of a production environment may be simulated so that code modules can be tested with regard to their ability to identify and remediate issues without concern for any adverse impacts to an actual production environment. Issues can be simulated in digital twin environment 136 to test for a code module's ability to identify the issues and subsequently remediate the issues.

Production environment 138 may include a live and operational system or network where computing and/or network services are provided. For example, production environment 138 may provide computational services, cloud services, streaming services, telecommunication services, storage services, and the like. Production environment 138 can be used to test code modules with the caveat that the testing process could potentially disrupt services provided to users. Thus, in some embodiments, production environment 138 may be used to test code modules that have already demonstrated a particular level of trust based on their source, reason for use, and/or previous testing (e.g., using computing device 130 and/or digital twin environment 136).

Network 140 may include a local area network (LAN), a wide area network (WAN) such as the Internet, or a combination of the two, and includes wired, wireless, or fiber optic connections. In general, network 140 can be any combination of connections and protocols known in the art that will support communications between trust service 102, development device 118, computing device 130, digital twin environment 136, and/or production environment 138 via their respective network interfaces in accordance with the described embodiments.

Figure 2:
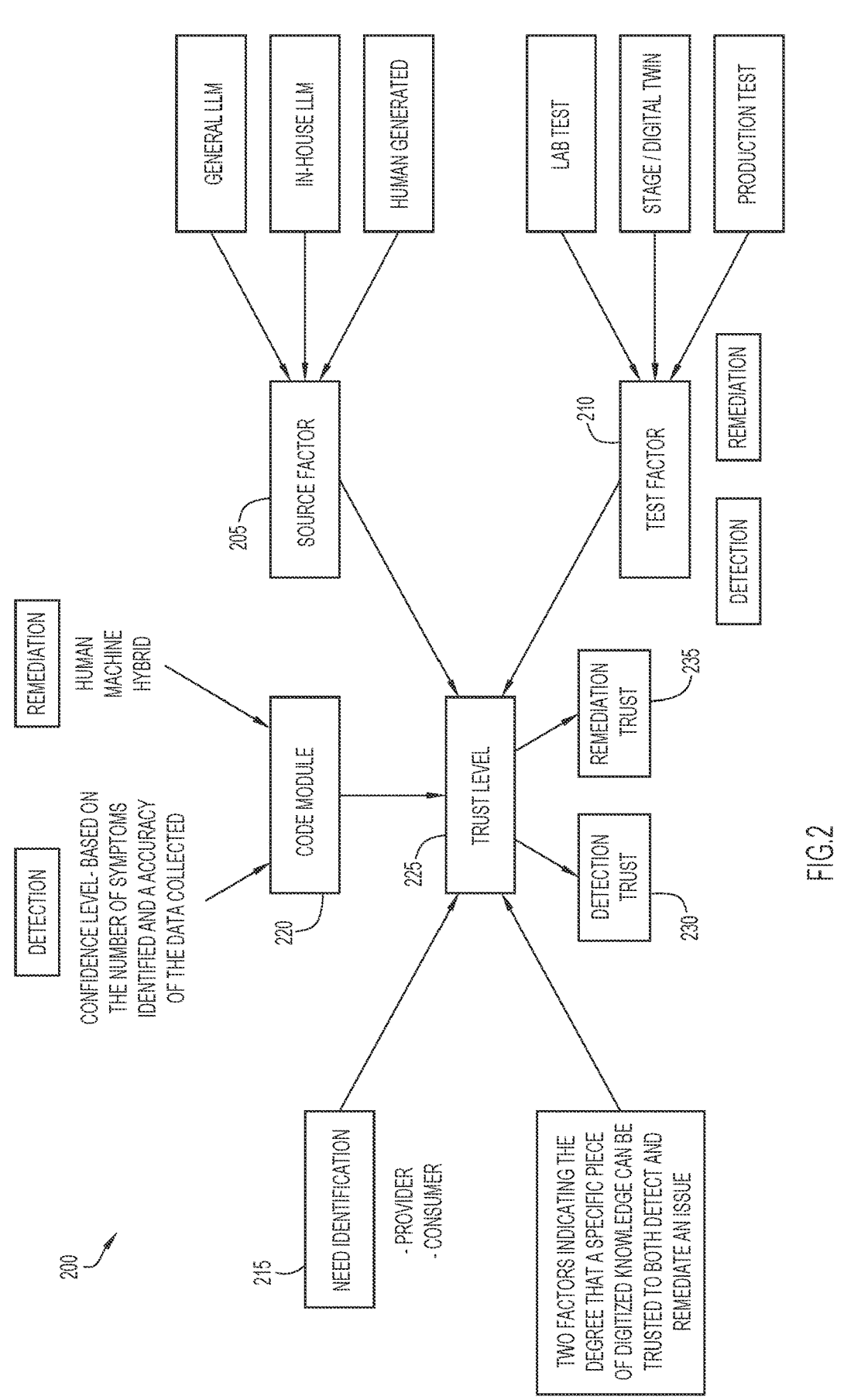
FIG. 2 is a block diagram depicting a system for determining trust scores for code modules, according to an example embodiment.

FIG. 2 is a block diagram depicting a system 200 for determining trust scores for code modules, according to an example embodiment. As depicted, system 200 determines a trust level 225, including a detection trust level 230 (e.g., the issue identification component) and a remediation trust level 235 (e.g., the issue remediation component) based on data that includes a source factor 205, a test factor 210, and a need identification factor 215 for a given code module (e.g., code module 220). It should be appreciated that for any datum that is considered in evaluating a trust score for given code module, different weights can be applied, thus enabling particular criteria to influence the trust score more or less than other criteria. Initially, code module 220 may include code for issue detection and remediation. The issue detection code can include a confidence level based on the number of symptoms that the code can identify regarding an issue, and the accuracy of the data collected, and the code for remediation can indicate whether remediation is done manually by a human, automatically by a machine, or a combination thereof. These qualitative aspects of the detection code and the remediation code can influence the trust score for code module 220.

Source factor 205 includes data that is used to describe a source of a code module. For various code modules, humans and/or AI/ML models (e.g., LLMs) act as the sources for creating code modules. Each source can be assigned a different level of trust. In the depicted example, sources for the source factor 205 can include a general LLM (e.g., an LLM developed by a particular organization), an in-house LLM (e.g., an LLM developed by the same organization in which a code module may be deployed), and a human-generated source. In one embodiment, the human-generated source may be associated with a highest level of trust, followed by an in-house LLM source and then a general LLM. As another example, five sources, ordered by descending trust level, can include an in-house human, an in-house LLM, a partner organization human, a consumer human, and a public LLM. An in-house human may have a highest trust level given the historical performance and motivation of the creator. An in-house LLM may include an in-house trained LLM that has a high level of confidence. A partner organization human may include a partner who is motivated to create code modules that increase the availability of their end user network; the trust level may be lower than the in-house sources as partners may have less product expertise and fewer resources to apply to internal quality assurance processes. In the case of a consumer human, it may be assumed that a consumer is motivated to create code modules that increases the availability of their network to end users; the trust level may be lower because consumer humans are less motivated to create general purpose code modules and may have fewer resources to apply to internal quality assurance processes. Finally, a public LLM source may include a general purpose/public LLM model that is trained with non-specific deployment and generally available content. These capabilities are developed to provide a response to a user request; however, the response is highly dependent on the quality of the request and the training of the LLM. Thus, code modules created with a public LLM may have the lowest source factor trust value.

Test factor 210 represents a dimension of trust based on how code modules are tested. Testing of a code module can be performed with regard to both its accuracy in detecting a problem and with regard to the remediation that is supplied to fix a problem or provide a workaround for a problem. Testing can occur in different environments in terms of scale, diversity, and specificity. Testing that occurs in generic environments may be considered to be less trustworthy than those occurring in environments that are representative of the environment where the code module will be used. The test factor may thus be the factor that is most likely to cause a code module's trust score to change over the code module's lifecycle, as testing can include phases such as the initial creator testing, more extensive in-house testing, consumer/partner lab testing, stage or digital twin testing, and finally, production testing.

Similarly to the source factor 205, test factor 210 may include a combination of various characteristics: who is doing the testing, the type of testing, the resemblance of a test to real-world deployment, and the environment in which the testing is conducted. Each of these factors can be assigned a particular value indicative of whether each factor should increase or decrease the trust score. The testing source can include an in-house testing source, a partner organization testing source, and a consumer testing source. The type of testing factor can include code review, unit testing (e.g., using lint checkers, tools used to flag programming errors or other potential issues), integration testing (i.e., testing in which various modules or components are tested as a combined entity), and/or solution testing (testing in a product user's environment). Another test factor 210 can include the degree to which a test resembles the deployment of a code module to a production environment, which can be described as a "resemblance" variable or "resemblance to production" variable. The resemblance variable can be assigned a value that indicates higher trust as the type of testing more closely resembles a production environment. In order of increasing trust, the type of testing can include a developer machine, a lab environment (e.g., an environment that may include fewer devices than a production environment, fewer networked devices, limited networked devices or no network communications between devices, less network traffic, fewer or more relaxed network or security policies, generally-configured devices rather than devices configured for a specific production environment, etc.), a stage environment (a near-replica of a production environment), a digital twin of a production environment, and a production environment. Yet another test factor 210 can include a testing environment factor, which can range from (in increasing level of trust) a single virtual device, a single physical device, a networked virtual device, and a networked physical device. Thus, test factor 210 can be determined based on a testing source variable, a type of testing variable, a resemblance variable, and/or a testing environment variable.

A need identification factor 215 may include a reason or justification for the code module, which can be a provider/in-house reason (e.g., identified by a member of an organization in which the code module may be deployed) or third-party reason, such as a consumer reason, which may be a reason from an organization who provides the provider's product or service to end users. Generally, a provider/in-house reason may be considered more trustworthy than other reasons, as a consumer-identified reason may be specific to the consumer's environment and not generalizable to other environments.

Thus, a trust score can be determined for code module 220 can be determined based on one or more of a need identification factor, a source factor, and a test factor. In some embodiments, a value for the issue detection/identification component can be determined by combining values for a need identification factor, a source factor, and a test factor, and a value for the issue remediation component can be determined by combining a source factor and a test factor. It should be appreciated that any numerical schema can be employed to quantify trust for each component and the underlying factors thereof, and any aspect can be weighted as desired in order to control the degree to which each aspect influences the trust score value.

Figure 3:
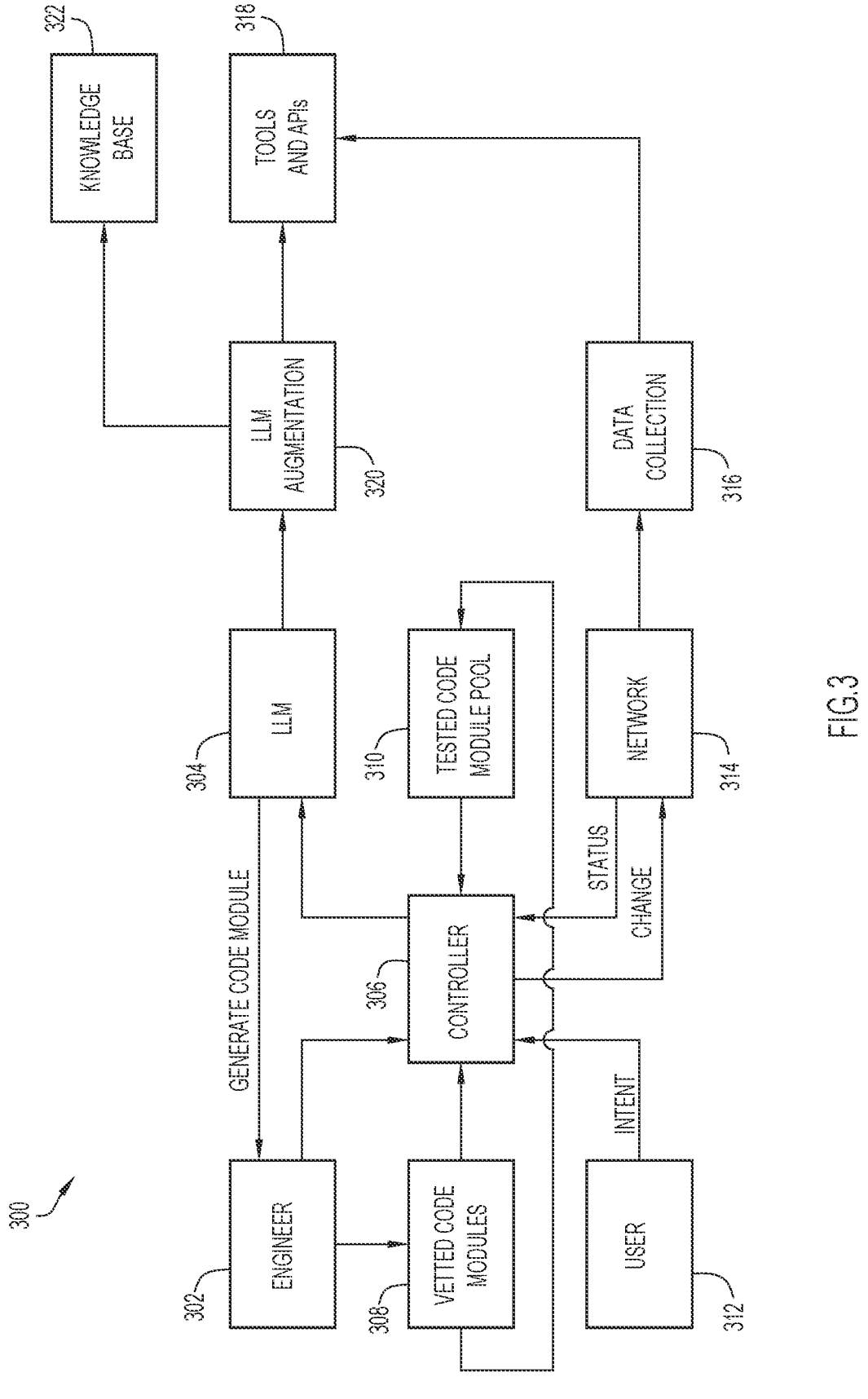
FIG. 3 is a block diagram depicting a lifecycle flow for code modules configured to perform issue identification and remediation tasks, according to an example embodiment.

FIG. 3 is a block diagram depicting a lifecycle flow 300 for code modules configured to perform issue identification and remediation tasks, according to an example embodiment. as depicted, lifecycle flow 300 an engineer 302 and an LLM 304 for generating a code module, a controller 306 for testing and/or deploying code modules, a list of vetted code modules 308 and a tested code module pool 310, a user 312, a network 314 (e.g., a production environment), and tools and application programming interfaces (APIs) 318. A knowledge base 322 stores any desired data regarding issue identification and remediation, which can be augmented via LLM augmentation 320 prior to ingestion by LLM 304.

Initially, an engineer 302 or LLM 304 may generate a code module. LLM 304 can generate a code module by accessing knowledge base 322 and tools and/or APIs 318 (any software used for identifying and/or remediating issues), which can be processed via LLM augmentation 320 to generate a larger corpus of training data. Thus, a foundation model (FM) can be used to create LLM 304 that specializes in generating code for identifying and remediating issues. Once generated, a code module can be processed by controller 306, which can test and/or deploy the code modules. Code modules can be assigned to a list of vetted code modules 308 that are manually reviewed (e.g., by engineer 302), and a tested code module pool 310 can be established via testing techniques according to the embodiments described herein.

Controller 306 may also receive intent data from a user 312, including a reason for each code module. Controller 306 may also deploy code modules to network 314 and collect data (data collection 316) over the lifecycle of deployed code modules in order to update the trust score for each code module. The collected data can be provided to tools and APIs 318 to update the inventory of tools and APIs that are used and/or tested, thus providing a feedback loop in which the number of trusted code modules can be expanded as the level of trust for each code module becomes more established over time.

Figure 4:
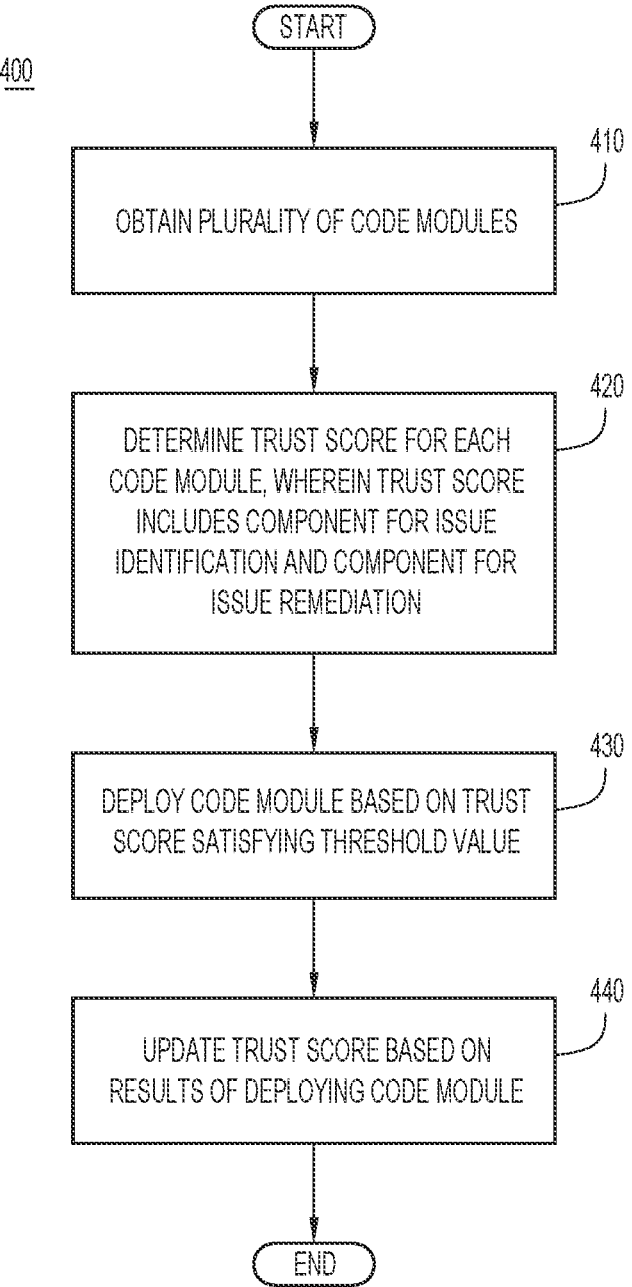
FIG. 4 is a flow chart of a method for selectively deploying code modules for issue identification and remediation tasks, according to an example embodiment.

FIG. 4 is a flow chart of a method 400 for selectively deploying code modules for issue identification and remediation tasks, according to an example embodiment.

A plurality of code modules is obtained at operation 410. Each code module can include instructions for identifying and remediating issues in a production environment, such as a computing system or network. The issue can include any type of issue (e.g., any software, hardware, and/or networking issues) and the code for identifying issues can include instructions to identify symptoms of a particular issue or set of issues. The code for remediating issues can include instructions such as fixes, workarounds, and the like, that are intended to address a particular identified issue or set of issues. Each code module can be generated by a human (e.g., a developer or engineer), an AI model (e.g., a generative model such as an LLM), or a combination thereof.

A trust score for each code module is determined at operation 420, wherein the trust score includes a first component for issue identification and a second component for issue remediation. Thus, in the context of trust, a code module's ability to identify issues can be separately tracked from a code module's ability to remediate issues. The trust score can include a numerical value for each component that quantifies a degree of trust that the code module can identify and remediate issues when deployed to a production environment. In particular, the numerical values can be determined based on assigned values for various features or attributes that describe a code module, including its origin (human-generated or machine-generated, developed in-house, by a partner, by a consumer, by a member of the public, etc.), the degree to which a code module has been tested and/or manually reviewed, the reason for deploying a code module, and the like. Each particular feature or attribute describing a code module can be assigned a value indicating the degree to which each feature or attribute is indicative of trust, and these values can be summed or otherwise combined to determine an overall trust score, including separate components for issue identification and remediation. In some embodiments, rather than representing a trust score as scalar values, a vector representation may be employed that encodes the underlying values for degree of trust for each feature or attribute of a code module. Vector representations enable different code modules to be compared with regard to trust in a highly-granular manner that enables a code module to be selectively deployed based on its level of trust for any specific feature or attribute or set of features or attributes. In the case of either a scalar or vector representation, time-series trust scores can be maintained so that a particular code module's change in trust over time can be determined.

A code module is deployed based on the code module's trust score satisfying a threshold value at operation 430. The trust score can be compared to a threshold, which can include separate values for each component of trust that is tracked. If the code module satisfies the threshold value(s), then the code module may be deployed to a production environment, at which point the code module may be actively utilized to identify and remediate the issue or set of issues for which the code module is designed.

The trust score of the code module is updated based on results of deploying the code module at operation 440. Over the lifecycle of the code module, the code module's trust score can be updated based on the code module's ability to identify and remediate issues. In particular, depending on whether the code module succeeds or fails to identify and/or remediate issues (including falsely reporting positive identifications of issues), the code module's trust score can be updated accordingly. Thus, a code module's trust score can be tracked over time, and if the code module no longer satisfies a threshold value, then the code module can be removed from the production environment.

Figure 5:
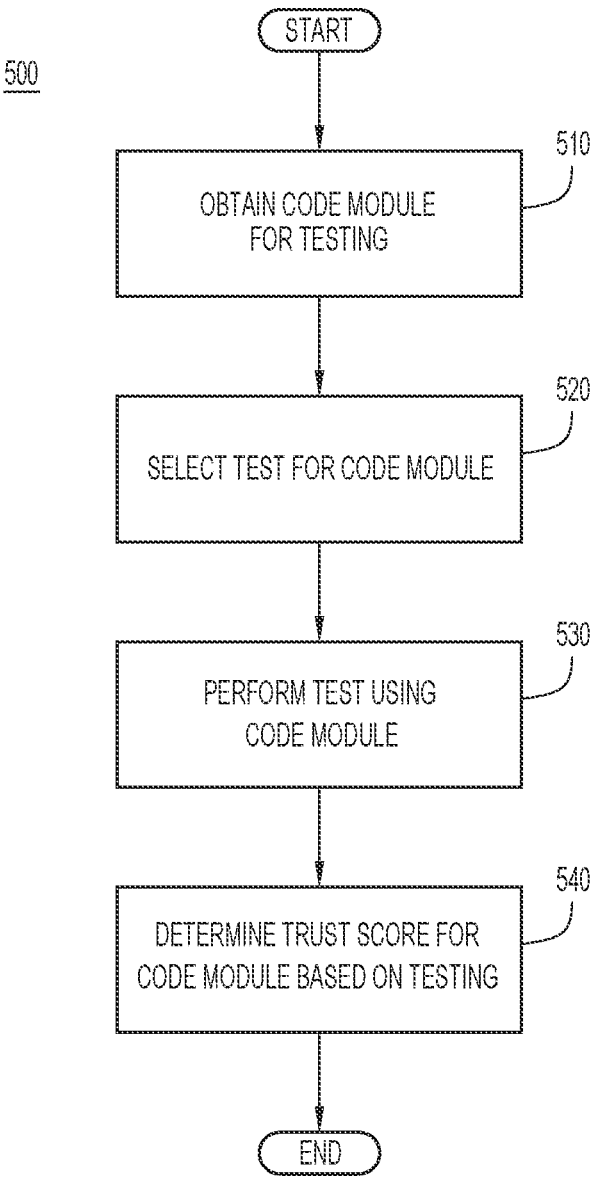
FIG. 5 is a flow chart of a method of testing a code module, according to an example embodiment.

FIG. 5 is a flow chart of a method 500 of testing a code module, according to an example embodiment.

A code module is obtained for testing at operation 510. The code module may be obtained from a repository of code modules, each of which can be generated by a human, an AI model, or a combination thereof. Additionally, metadata describing the code module may be obtained, such as an identity of the issue that the code module is configured to address, and any history of prior testing performed using the code module.

A test is selected for the code module at operation 520. The type of test can include a test using a general computing device, a test using a lab, a test using a stage environment (a near-replica of a production environment), a test using a digital twin of a production environment, and a test in a live production environment. In some embodiments, the test is selected based on a previously-determined trust score for a code module, which can be based on the source factor of a test factor from previous testing, and/or a need identification factor of the code module. For example, if the code module satisfies a particular level of trust, then a test may be selected that more closely resembles deployment to a production environment; in order, the tests may range from a general computing device as least resembling the production environment, then a test using a lab, then a test using a stage environment, then a test using a digital twin of a production environment, and lastly, a test in a live production environment. In some embodiments, if a code module has previously been tested using a particular test, a next test can be selected using a test that more closely resembles the production environment. Thus, testing can be done in phases, with each phase more closely simulating real-world conditions.

A test is conducted using the code module at operation 530. An issue can be manually triggered during the test to determine whether the code module detects the issue (e.g., based on the symptoms caused by the issue), and if detected, execution of the code module can be monitored to determine whether the code module successfully remediates the issue. Thus, a code module may pass a test if the issue is successfully detected and remediated; a code module may partially fail the test if an issue is detected and not remediated, and a code module may fully fail a test if no issue is detected when one is expected. Additionally or alternatively, a result of testing may include a code module issuing a false positive, such as when an issue is reportedly detected when the issue is not actually present in the testing environment; in such a case, a code module may also be deemed to fail the test.

A trust score is determined for the code module based on the testing at operation 540. The results of passing or failing the test can be used to determine or update the trust score for the code module. If the trust score satisfies a threshold value based on the test, then the code module may be deployed to a production environment. However, if a code module successfully passes a test but does not satisfy a threshold value, additional testing can be performed to determine if the trust score can be updated such that the trust score satisfies the threshold value.

Figure 6:
FIG. 6 is a block diagram of a device that may be configured to perform operations relating to monitoring and/or mitigating carbon emissions, as presented herein.

Referring now to FIG. 6, FIG. 6 illustrates a hardware block diagram of a computing device 600 that may perform functions associated with operations discussed herein in connection with the techniques depicted in FIGS. 1-5. In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O 614, and logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O 614 allow for input and output of data and/or information with other entities that may be connected to computing device 600. For example, I/O 614 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 602.11 (e.g., Wi-Fi®/Wi-Fi6®), IEEE 602.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a computer-implemented method including: obtaining a plurality of code modules, wherein each code module includes instructions for issue identification and issue remediation in computer devices, networking devices or software running on the computer devices or networking devices; determining a trust score for each code module of the plurality of code modules, wherein the trust score includes a first trust score component for issue identification and a second trust score component for issue remediation, and wherein the trust score is based on a source of each code module that is selected from a group of a human-generated source and an artificial intelligence model-generated source; deploying a particular code module of the plurality of code modules based on the trust score of the particular code module satisfying a threshold value; and updating the trust score for the particular code module based on results of deploying the particular code module.

In some aspects, the techniques described herein relate to a computer-implemented method, wherein the trust score for each code module is determined by testing each code module for issue identification or issue remediation using a test that is selected from a group of: a general computing device test, a digital twin test simulating a production environment, and a production test in which each code module is deployed to the production environment.

In some aspects, the techniques described herein relate to a computer-implemented method, wherein the trust score for each code module is based on a demand for each code module, and wherein the demand is selected from a group of: a machine-generated reason for deploying each code module and a human-generated reason for deploying each code module.

In some aspects, the techniques described herein relate to a computer-implemented method, wherein the human-generated reason includes an in-house reason and a third-party reason.

In some aspects, the techniques described herein relate to a computer-implemented method, wherein the trust score includes a vector that includes a plurality of trust score component values.

In some aspects, the techniques described herein relate to a computer-implemented method, further including: removing the particular code module from deployment in response to updating the trust score of the particular code module causing the trust score to not satisfy the threshold value.

In some aspects, the techniques described herein relate to a computer-implemented method, further including: replacing the particular code module with a replacement code module, of the plurality of code modules, that identifies and remediates a same issue as the particular code module in response to the replacement code module having a higher trust score than the particular code module.

In some aspects, the techniques described herein relate to a system including: one or more computer processors; one or more computer readable storage media; and program instructions stored on the one or more computer readable storage media for execution by at least one of the one or more computer processors, the program instructions including instructions to: obtain a plurality of code modules, wherein each code module includes instructions for issue identification and issue remediation in computer devices, networking devices or software running on the computer devices or networking devices; determine a trust score for each code module of the plurality of code modules, wherein the trust score includes a first trust score component for issue identification and a second trust score component for issue remediation, and wherein the trust score is based on a source of each code module that is selected from a group of a human-generated source and an artificial intelligence model-generated source; deploy a particular code module of the plurality of code modules based on the trust score of the particular code module satisfying a threshold value; and update the trust score for the particular code module based on results of deploying the particular code module.

In some aspects, the techniques described herein relate to a system, wherein the trust score for each code module is determined by testing each code module for issue identification or issue remediation using a test that is selected from a group of: a general computing device test, a digital twin test simulating a production environment, and a production test in which each code module is deployed to the production environment.

In some aspects, the techniques described herein relate to a system, wherein the trust score for each code module is based on a demand for each code module, and wherein the demand is selected from a group of: a machine-generated reason for deploying each code module and a human-generated reason for deploying each code module.

In some aspects, the techniques described herein relate to a system, wherein the human-generated reason includes an in-house reason and a third-party reason.

In some aspects, the techniques described herein relate to a system, wherein the trust score includes a vector that includes a plurality of trust score component values.

In some aspects, the techniques described herein relate to a system, wherein the program instructions further include instructions to: remove the particular code module from deployment in response to updating the trust score of the particular code module causing the trust score to not satisfy the threshold value.

In some aspects, the techniques described herein relate to a system, wherein the program instructions further include instructions to: replace the particular code module with a replacement code module, of the plurality of code modules, that identifies and remediates the same issue as the particular code module in response to the replacement code module having a higher trust score than the particular code module.

In some aspects, the techniques described herein relate to one or more non-transitory computer readable storage media having program instructions embodied therewith, the program instructions executable by a computer to cause the computer to perform operations including: obtaining a plurality of code modules, wherein each code module includes instructions for issue identification and issue remediation in computer devices, networking devices or software running on the computer devices or networking devices; determining a trust score for each code module of the plurality of code modules, wherein the trust score includes a first trust score component for issue identification and a second trust score component for issue remediation, and wherein the trust score is based on a source of each code module that is selected from a group of a human-generated source and an artificial intelligence model-generated source; deploying a particular code module of the plurality of code modules based on the trust score of the particular code module satisfying a threshold value; and updating the trust score for the particular code module based on results of deploying the particular code module.

In some aspects, the techniques described herein relate to one or more non-transitory computer readable storage media, wherein the trust score for each code module is determined by testing each code module for issue identification or issue remediation using a test that is selected from a group of: a general computing device test, a digital twin test simulating a production environment, and a production test in which each code module is deployed to the production environment.

In some aspects, the techniques described herein relate to one or more non-transitory computer readable storage media, wherein the trust score for each code module is based on a demand for each code module, and wherein the demand is selected from a group of: a machine-generated reason for deploying each code module and a human-generated reason for deploying each code module.

In some aspects, the techniques described herein relate to one or more non-transitory computer readable storage media, wherein the human-generated reason includes an in-house reason and a third-party reason.

In some aspects, the techniques described herein relate to one or more non-transitory computer readable storage media, wherein the trust score includes a vector that includes a plurality of trust score component values.

In some aspects, the techniques described herein relate to one or more non-transitory computer readable storage media, wherein the program instructions further cause the computer to: remove the particular code module from deployment in response to updating the trust score of the particular code module causing the trust score to not satisfy the threshold value.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:

obtaining a plurality of code modules, wherein each code module includes instructions for issue identification and issue remediation in computer devices, networking devices or software running on the computer devices or networking devices;

selecting a test for each code module of the plurality of code modules;

determining a trust score for each code module of the plurality of code modules by performing the test for each code module, wherein the trust score includes a first trust score component for issue identification and a second trust score component for issue remediation, and wherein the trust score is based on a source of each code module that is selected from a group of a human-generated source and an artificial intelligence model-generated source;

deploying a particular code module of the plurality of code modules based on the trust score of the particular code module satisfying a threshold value, wherein deploying the particular code module includes transmitting instructions to use the particular code module in a production environment, the production environment including at least one device arranged to provide services to an end-user; and updating the trust score for the particular code module based on results of deploying the particular code module.

2. The computer-implemented method of claim 1, wherein determining the trust score for each code module of the plurality of code modules by performing the test for each code module includes conducting the test using each code module to test each code module for issue identification or issue remediation, wherein the test is selected from a group of: a general computing device test, a digital twin test simulating the production environment, and a production test in which each code module is deployed to the production environment.

3. The computer-implemented method of claim 1, wherein the trust score for each code module is based on a demand for each code module, and wherein the demand is selected from a group of: a machine-generated reason for deploying each code module and a human-generated reason for deploying each code module.

4. The computer-implemented method of claim 3, wherein the human-generated reason includes an in-house reason and a third-party reason.

5. The computer-implemented method of claim 1, wherein the trust score comprises a vector that includes a plurality of trust score component values.

6. The computer-implemented method of claim 1, further comprising:

removing the particular code module from deployment in response to updating the trust score of the particular code module causing the trust score to not satisfy the threshold value.

7. The computer-implemented method of claim 1, further comprising:

replacing the particular code module with a replacement code module, of the plurality of code modules, that identifies and remediates a same issue as the particular code module in response to the replacement code module having a higher trust score than the particular code module.

8. A system comprising:

one or more computer processors;

one or more computer readable storage media; and program instructions stored on the one or more computer readable storage media for execution by at least one of the one or more computer processors, the program instructions comprising instructions to:

obtain a plurality of code modules, wherein each code module includes instructions for issue identification and issue remediation in computer devices, networking devices or software running on the computer devices or networking devices;

select a test for each code module of the plurality of code modules;

determine a trust score for each code module of the plurality of code modules by performing the test for each code module, wherein the trust score includes a first trust score component for issue identification and a second trust score component for issue remediation, and wherein the trust score is based on a source of each code module that is selected from a group of a human-generated source and an artificial intelligence model-generated source;

deploy a particular code module of the plurality of code modules based on the trust score of the particular code module satisfying a threshold value, wherein the program instructions comprising instructions to deploy the particular code module include program instructions comprising instructions to transmit instructions to use the particular code module in a production environment, the production environment including at least one device arranged to provide services to an end-user; and update the trust score for the particular code module based on results of deploying the particular code module.

9. The system of claim 8, wherein the trust score for each code module is determined by testing each code module for issue identification or issue remediation using the test, wherein the test is selected from a group of: a general computing device test, a digital twin test simulating the production environment, and a production test in which each code module is deployed to the production environment.

10. The system of claim 8, wherein the trust score for each code module is based on a demand for each code module, and wherein the demand is selected from a group of: a machine-generated reason for deploying each code module and a human-generated reason for deploying each code module.

11. The system of claim 10, wherein the human-generated reason includes an in-house reason and a third-party reason.

12. The system of claim 8, wherein the trust score comprises a vector that includes a plurality of trust score component values.

13. The system of claim 8, wherein the program instructions further comprise instructions to:

remove the particular code module from deployment in response to updating the trust score of the particular code module causing the trust score to not satisfy the threshold value.

14. The system of claim 8, wherein the program instructions further comprise instructions to:

replace the particular code module with a replacement code module, of the plurality of code modules, that identifies and remediates a same issue as the particular code module in response to the replacement code module having a higher trust score than the particular code module.

15. One or more non-transitory computer readable storage media having program instructions embodied therewith, the program instructions executable by a computer to cause the computer to perform operations including:

obtaining a plurality of code modules, wherein each code module includes instructions for issue identification and issue remediation in computer devices, networking devices or software running on the computer devices or networking devices;

selecting a test for each code module of the plurality of code modules;

determining a trust score for each code module of the plurality of code modules by performing the test for each code module, wherein the trust score includes a first trust score component for issue identification and a second trust score component for issue remediation, and wherein the trust score is based on a source of each code module that is selected from a group of a human-generated source and an artificial intelligence model-generated source;

deploying a particular code module of the plurality of code modules based on the trust score of the particular code module satisfying a threshold value, wherein deploying the particular code module includes transmitting instructions to use the particular code module in a production environment, the production environment including at least one device arranged to provide services to an end-user; and updating the trust score for the particular code module based on results of deploying the particular code module.

16. The one or more non-transitory computer readable storage media of claim 15, wherein the trust score for each code module is determined by testing each code module for issue identification or issue remediation using the test, wherein the test is selected from a group of: a general computing device test, a digital twin test simulating the production environment, and a production test in which each code module is deployed to the production environment.

17. The one or more non-transitory computer readable storage media of claim 15, wherein the trust score for each code module is based on a demand for each code module, and wherein the demand is selected from a group of: a machine-generated reason for deploying each code module and a human-generated reason for deploying each code module.

18. The one or more non-transitory computer readable storage media of claim 17, wherein the human-generated reason includes an in-house reason and a third-party reason.

19. The one or more non-transitory computer readable storage media of claim 15, wherein the trust score comprises a vector that includes a plurality of trust score component values.

20. The one or more non-transitory computer readable storage media of claim 15, wherein the program instructions further cause the computer to:

remove the particular code module from deployment in response to updating the trust score of the particular code module causing the trust score to not satisfy the threshold value.

* * * * *